United States Patent [19]
Leitgeb

[11] 3,801,833
[45] Apr. 2, 1974

[54] PULSE GENERATOR FOR A BRUSHLESS DIRECT-CURRENT ROTOR EXCITED ELECTRICAL MACHINE HAVING ROTOR MOUNTED THYRISTORS

[75] Inventor: Wilhelm Leitgeb, Berlin, Germany

[73] Assignee: Siemens Aktiengesellschaft, Munchen, Germany

[22] Filed: July 12, 1972

[21] Appl. No.: 270,925

[30] Foreign Application Priority Data
July 23, 1971 Germany............................ 2137918

[52] U.S. Cl.................................. 318/254, 318/138
[51] Int. Cl. .......................................... H02k 29/02
[58] Field of Search ........... 318/138, 254, 439, 187, 318/186

[56] References Cited
UNITED STATES PATENTS

| | | | |
|---|---|---|---|
| 3,406,323 | 10/1968 | Jordan | 318/186 |
| 3,453,512 | 7/1969 | Polakowski | 318/254 |
| 3,386,019 | 5/1968 | Hill | 318/254 |
| 3,611,082 | 10/1971 | Schmitz | 318/187 |
| 3,381,192 | 4/1968 | Neuitle et al. | 318/138 |
| 3,131,341 | 4/1964 | Uniazeff | 318/138 |
| 3,286,147 | 11/1966 | Parker et al. | 318/138 |

Primary Examiner—G. R. Simmons
Attorney, Agent, or Firm—Kenyon & Kenyon Reilly Carr & Chapin

[57] ABSTRACT

A pulse generator is disclosed for generating control voltages for the revolving thyristors of a brushless direct-current excited electrical machine equipped with an exciter machine. The pulse generator includes a rotor mounted on the rotor shaft of the brushless machine, a winding carried by the rotor of the pulse generator which has poles and phases corresponding in number to the poles and phases of the exciter machine, and at least two stationary magnetic systems disposed opposite the rotor of the pulse generator. The magnetic systems are displaced with respect to each other by a specific electrical angle so that these systems induce voltages in the rotor winding of the pulse generator which add to form a sum voltage adaptable for triggering the thyristors.

7 Claims, 5 Drawing Figures

3,801,833

PULSE GENERATOR FOR A BRUSHLESS DIRECT-CURRENT ROTOR EXCITED ELECTRICAL MACHINE HAVING ROTOR MOUNTED THYRISTORS

BACKGROUND OF THE INVENTION

The invention relates to a pulse generator for brushless direct-current excited electrical machines such as reactive power machines or the like. The pulse generator generates control voltages for triggering the thyristors of the brushless machine.

It is known to excite the rotating excitation winding of direct-current excited electrical machines by means of revolving rectifiers in the form of diodes with an exciter machine mounted on the same shaft. The revolving rectifiers are then supplied from the rotating single or multiphase winding of the exciter machine. This is in contrast to the technique used exclusively at an earlier time wherein the rotating excitation windings were supplied via slip rings from a stationary direct-current source.

It is, however, a disadvantage of such brushless direct-current excitation, that direct action upon the excitation circuit of the machine is not possible when the machine is being de-energized and the de-energizing time is therefore very long. This disadvantage is noticeable particularly in reactive-power machines with rapidly changing loads such as are increasingly used in rolling mills.

In order to also substantially increase the de-energizing speed for rotating-rectifier excitation, it is necessary to use controlled thyristors in lieu of uncontrolled diodes, so that it is possible to reverse the excitation voltage in the event the machine is de-energized. However, it is necessary for this purpose to transmit control signals for the thyristors to the rotating system; these signals must have a very definite phase relationship with respect to the voltages of the exciter machine induced in the rotating system and the phase relationship must be variable within wide limits.

SUMMARY OF THE INVENTION

It is an object of the invention to provide a pulse generator for establishing a definite phase relationship between the control signals for the thyristors and the voltages of the exciting machine induced in the rotating system of a brushless direct-current excited electrical machine. Subsidiary to this object, it is an object of the invention to provide a pulse generator for varying this phase relationship within wide limits.

The invention achieves the foregoing objects at low cost. The pulse generator of the invention is applicable to brushless direct-current excited electrical machines, especially, reactive power machines and the like which operate at constant or nearly constant rpm. The excitation winding of the brushless machine is supplied through rotating controllable thyristors from the winding of the exciting machine mounted on the same shaft with the thyristors. The winding of the exciting machine has one or more phases. A pulse generator generates control voltages to trigger the thyristors.

According to a feature of the invention the pulse generator includes a laminated rotor mounted on the rotor shaft and having a plurality of slots. A pulse generator winding is disposed in these slots and has a number of poles corresponding to the number of poles of the exciting machine as well as having a number of phases equal to a whole number, n, times the number of phases of the exciting machine where $n \geq 1$. Also as part of the pulse generator, there are at least two laminated magnetic systems for inducing respective voltages in the pulse generator winding. Each of the systems has the same pole pitch and is spaced from the laminated rotor the same air gap distance. The systems are fixedly disposed relative to the laminated rotor and displaced with respect to each other a distance corresponding to a given electrical angle so as to cause the voltages induced in the pulse generator winding to add to form a voltage adaptable for triggerring the thyristors.

According to another feature of the invention, the magnetic systems include respective magnetic system excitation windings, and adjusting means connected to the last-mentioned excitation winding respectively for selectively regulating the magnitude of the excitation currents therein to, in turn, selectively adjust the magnitudes of said voltages induced in the pulse generator winding, whereby the voltage adaptable for triggering the thyristors is adjusted in phase.

According to still another feature of the invention, electronic evaluation means can be provided for receiving and utilizing the adaptable voltage to form signals for triggering the thyristors.

As mentioned, the pulse generator includes at least two magnetic systems. These systems are arranged as stator members and are disposed opposite the laminated rotor of the pulse generator which is configured in the manner of a rotor of an asynchronous slip ring rotor machine. This laminated rotor of the pulse generator therefor consists of circular, annular laminations, at the circumference of which appropriate slots are provided to accommodate the single-phase or multiphase winding of the pulse generator. The number of poles of this winding corresponds to the number of poles of the exciter machine and the number of phases corresponds to the number of phases of the exciter machine or to a multiple thereof. The magnetic systems are arranged stationary in space so that they are displaced with respect to each other by a definite electrical angle and so that the voltages induced by the systems in the winding of the pulse generator are additive.

These induced voltages in the winding of the pulse generator have a very definite phase relationship to the voltages induced in the rotating system of the exciter machine. The sum voltage in the pulse generator obtained by the addition of the induced voltages is thus synchronous with the voltages of the exciter machine. The sum voltage is evaluated electronically, for example, in such a manner that its zero crossing is utilized as a signal of constant phase relationship for triggering the thyristors. If the magnitude of the excitation currents in one or both magnetic systems of the pulse generator are now changed, the zero crossing of the sum voltage changes, although the latter is synchronous with the voltages of the exciter machine. In this way, control signals for the thyristors can be transmitted to the rotating system which are variable and yet still have a definite phase relationship to the voltages of the exciter machine. The range within which the zero crossing of the sum voltages of the pulse generator can shift is dependent upon the selected excitation currents in the magnetic systems. Under certain circumstances, it may be advisable to change also the polarity of the exciting currents.

According to still another feature of the invention, the two magnetic systems which are displaced in a circumferential direction by a definite electrical angle can be arranged one behind the other in the axial direction. In this embodiment the axial dimension of the single-phase or multi-phase winding of the rotor must extend at least over the two magnetic systems. As another feature, all the coils of the single-phase or multi-phase winding of the pulse generator in each phase are connected in series so as to form a wave winding.

And further, the two magnetic systems are disposed next to each other along the circumference in such a manner that one is displaced with respect to the other by a desired electrical angle.

Although the invention is illustrated and described herein as a pulse generator for a brushless direct-current excited electrical machine, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFFERED EMBODIMENTS

Figure 1:
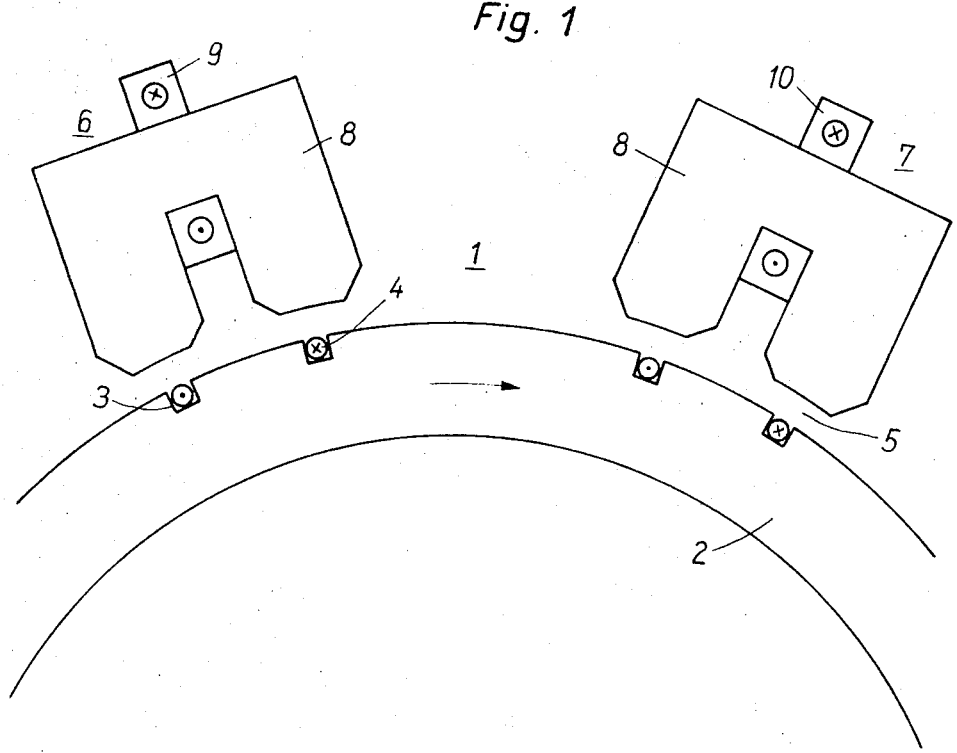
FIG. 1 is a schematic diagram illustrating a radial cross-section taken through the pulse generator according to the invention for an electric machine with brushless direct-current excitation.

An electric reactive-power machine with direct-current excitation is supplied with excitation current without slip rings by means of an exciter machine mounted on the shaft of a reactive power machine and by means of revolving, controlled thyristors. The pulse generator 1 shown schematically in FIG. 1 is also mounted on the shaft of the machine so that control signals are available which are variable within wide limits for triggering the thyristors.

The rotor 2 of this pulse generator 1 is composed of annular metal laminations having slots 3 at the rotor surface in which the conductors 4 of a winding are arranged. The number of phases and poles of the winding corresponds to the number of phases and poles of the exciter machine. In this winding, all the coils of a phase are connected in series and thus form a wave winding.

Two magnetic systems 6 and 7 are arranged stationary in space and are separated from the rotating rotor 2 by a constant air gap 5. The iron core 8 of each system is stacked of horseshoe-shaped laminations. Magnetic systems 6 and 7 carry excitation windings 9 and 10 respectively. An exciting directcurrent flows through these windings and is adjustable in magnitude. The two magnetic systems 6 and 7 are disposed along the circumference of the rotor 2 in such a manner that they are displaced with respect to each other by a definite electrical angle $\alpha$, for example $\alpha = 90°$. The coil width of the winding of the rotor 2 corresponds to the pole pitch of the magnetic systems.

Figure 2:
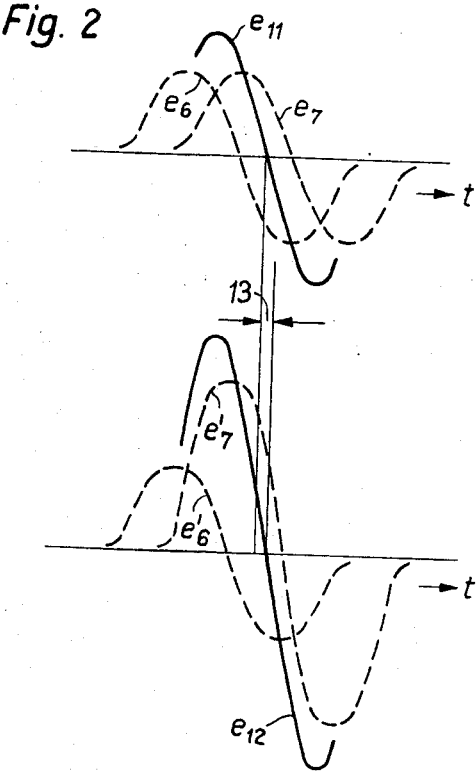
FIG. 2 shows the waveform of the sum voltage induced in the rotor of the pulse generator for selected exciting currents of different magnitude for the magnetic systems of the pulse generator of FIG. 1.

The magnetic field generated by the direct-current that flows through the excitation windings 9 and 10 of the two magnetic systems 6 and 7, respectively induces voltages in the conductors 4 of the winding, arranged on the rotor 2 of the pulse generator 1; these voltages are added in each case in the coils of each phase of the winding. The waveform of the voltages induced by the magnetic systems as a function of time is shown in FIG. 2. In the upper set of waveforms of FIG. 2, the respective exciting currents in the excitation windings 9 and 10 of the two magnetic systems 6 and 7 are equal, so that two component voltages $e_6$ and $e_7$ of equal magnitude are obtained. The component voltages $e_6$ and $e_7$ are shown by broken lines in FIG. 2 and add in the rotor winding of the pulse generator to form the sum voltage $e_{11}$ shown by the solid line.

If now the magnitude of the exciting current flowing through the excitation winding 10 of the second magnetic system 7 is changed, for example, increased by a factor of 2, the component voltages $e_6'$ and $e_7'$ are obtained which are shown by broken lines in the lower set of waveforms in FIG. 2. These again add to form the sum voltage $e_{12}$ shown by the solid line.

Figure 3:
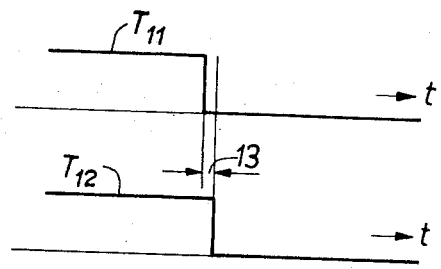
FIG. 3 illustrates the triggering signal for the revolving thyristors obtained by electronically evaluating the sum voltages.

FIG. 2 shows that the zero crossing of these sum voltages $e_{11}$ and $e_{12}$ are displaced with respect to each other by a definite amount 13. A displacement of the zero crossing of the voltage induced in the rotor winding of the pulse generator 1 has therefore been achieved by changing the magnitude of the exciting current of one of the two magnetic systems. This voltage is synchronous with the voltages of the exciter machine and each zero crossing thereof can be utilized by a suitable electronic evaluation circuit to form a signal of constant phase relationship for triggering the thyristors. Such a triggering signal is indicated in FIG. 3. A change in the excitation current of one of the two magnetic systems now results in a phase shift of this signal because of the shift in time of the zero crossing. This makes it possible to transmit control signals for the thyristors to the rotating system comprising the rotor 2 of the pulse generator 1 in a simple manner; these control signals have a very definite phase relationship to the respective voltages of the exciter machine induced in the rotating system and are variable within wide limits. The range within which the zero crossing of the induced sum voltage changes is dependent upon the selection of the magnitudes of the exciting current, which can, for example, also be interchanged as to polarity and is dependent upon the choice of the electrical angle $\alpha$ between the two magnetic systems.

Since the voltages induced in the winding of the rotor 2 of the pulse generator 1 depend on the speed of rotation, the pulse generator according to the invention can be used only with machines, the operating speed of which is either constant or varies only slightly. Because the rotor 2 of the pulse generator 1 and the magnetic systems 6 and 7 are built up for laminations, very rapid changes of the signal can be applied without the occurrence of a delay introduced by damping. The pulse generator therefore provides a high degree of dynamic control accuracy.

Figure 4:
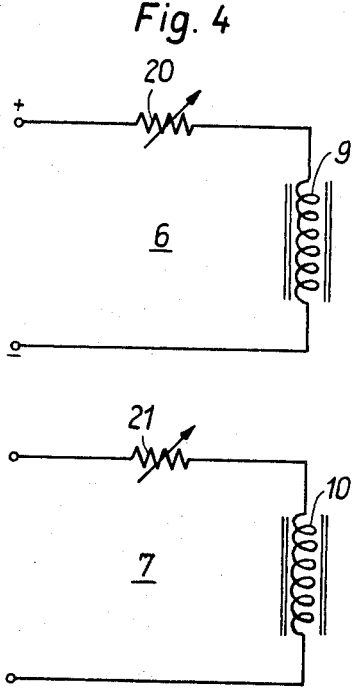
FIG. 4 is a schematic diagram of the respective exitation windings of the magnetic systems of the pulse generator of FIG. 1.
Figure 5:
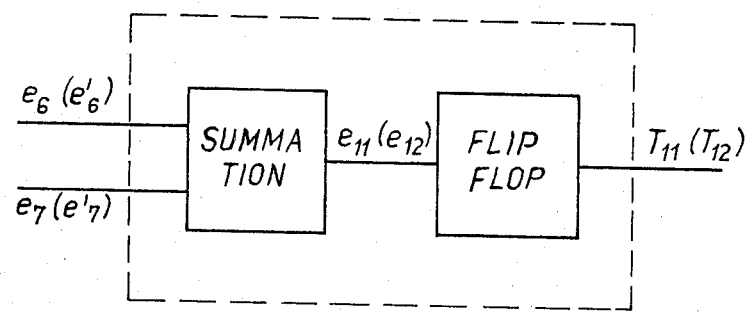
FIG. 5 is a schematic block diagram of an electronic circuit for evaluating the sum voltage produced by the generator of FIG. 1 to produce control impulses for triggering the thyristors.

The respective excitation currents of the magnetic systems 6 and 7 can be adjusted by adjusting means in the form of variable resistors 20 and 21 connected into the supply circuits of windings 9 and 10 as indicated schematically in FIG. 4. The sum voltage produced in the winding of the pulse generator rotor 2 is supplied to an electronic evaluation circuit for forming the triggering signal of FIG. 3. A suitable evaluation circuit is given in FIG. 5 as a block diagram with all component circuits designated by appropriate legends. The constant phase relationship of the triggering signal to the changing sum voltage is indicated in FIG. 3 by the displacement 13. Trigger signal waveforms $T_{11}$ and $T_{12}$ then correspond to sum voltage waveforms $e_{11}$ and $e_{12}$ respectively.

What is claimed is:

1. In a brushless direct-current excited electrical rotating machine such as a reactive power machine or the like operable at constant or nearly constant rpm and having a rotor mounted on a rotor shaft, a field excitation winding mounted on the rotor, an exciting machine mounted on the rotor shaft and having a winding of at least one phase rotatable with the rotor shaft, controllable thyristors also rotatable with the rotor for supplying the field excitation winding with excitation current from the winding of the exciting machine, and a pulse generator for generating control voltages to trigger the thyristors, the pulse generator comprising a laminated rotor mounted on the rotor shaft and having a plurality of slots, a pulse generator winding disposed in said slots and having a number of poles corresponding to the number of poles of the exciting machine, said pulse generator winding also having a number of phases equal to a whole number, n, times the number of phases of the exciting machine where $n \geq 1$, at least two laminated magnetic systems for inducing respective voltages in said pulse generator winding, each of said systems having the same pole pitch and being spaced from said laminated rotor the same air gap distance, said systems being fixedly disposed relative to said laminated rotor and displaced with respect to each other a distance corresponding to a given electrical angle so as to cause the voltages induced in said pulse generator winding to add to form a voltage adaptable for triggering the thyristors.

2. The pulse generator of claim 1 wherein said magnetic systems comprise respective magnetic system excitation windings, and adjusting means connected to said last-mentioned excitation windings respectively for selectively regulating the magnitude of the excitation currents therein to, in turn, selectively adjust the magnitudes of said voltages induced in said pulse generator winding, whereby said voltage adaptable for triggering the thyristors is adjusted in phase.

3. The pulse generator of claim 2 wherein each of said magnetic systems includes a laminated iron core, said core being made up of laminated U-shaped sheets of iron.

4. The pulse generator of claim 2, comprising electronic evaluation means for receiving and utilizing said adaptable voltage for forming signals for triggering the thyristors.

5. The pulse generator of claim 1, said magnetic systems being disposed one behind the other along the rotor shaft.

6. The pulse generator of claim 5, said pulse generator winding having a coil width corresponding to said pole pitch of said magnetic systems.

7. The pulse generator of claim 1, said pulse generator winding being a wave winding, and said magnetic systems being mounted one next to the other along the circumferential direction of said laminated rotor.

* * * * *

UNITED STATES PATENT OFFICE
CERTIFICATE OF CORRECTION

Patent No. 3,801,633      Dated April 2, 1974

Inventor(s) Wilhelm Leitgeb

It is certified that error appears in the above-identified patent and that said Letters Patent are hereby corrected as shown below:

In the Foreign Application Priority Data change the file number of the German application upon which the claim for priority is based from "2137918" to --P 21 37 918.0--

In column 5, line 1, change "for laminations" to --from laminations--

Signed and sealed this 10th day of September 1974.

(SEAL)
Attest:

McCOY M. GIBSON, JR.      C. MARSHALL DANN
Attesting Officer      Commissioner of Patents